Patented May 23, 1944

2,349,381

UNITED STATES PATENT OFFICE 2,349,381

PROCESS OF TREATING SOYBEAN OIL

Harvey D. Royce, Savannah, Ga., assignor to The Southern Cotton Oil Company, New Orleans, La., a corporation of New Jersey No Drawing. Application September 4, 1941, Serial No. 409,534

5 Claims. (Cl. 260—398.5)

This invention relates to a process of treating soy bean oil, and more particularly to a process of treatment of soy bean oil, and partially hydrogenated soy bean oil, to improve such oil from the standpoint of edibility and stability.

It is well known that soy bean oil that has been refined, bleached and deodorized by any of the ordinary methods now used, has a bland, neutral flavor immediately after processing but that a flavor reversion sets in soon after the processing, developing a characteristic "grassy" or "beany" flavor, and that upon storage, even in a few days if under ordinary conditions, the flavor and odor become so strong as to be unpalatable and render the oil undesirable as a foodstuff. It is also well known that such flavor reversion is accelerated by heat, by light and by the access of air, but even when stored in containers and shielded from the light, soy bean oil processed by the usual methods now in use undergoes a flavor reversion too rapidly to favor its widespread use as a foodstuff.

In order to increase the flavor stability of soy bean oil it has become a common practice to partially hydrogenate it to a lard-like consistency, thus converting the highly unsaturated linolenic glycerides to the less-reactive linoleic and oleic glycerides. The present invention applies not only to treatment of soy bean oil but also to treatment of such partially hydrogenated soy bean oil, and effects a marked further improvement in its flavor stability.

The principal object of the invention is to provide a treatment of the soy bean oil or partially hydrogenated soy bean oil which will improve its flavor, odor and flavor stability so as to increase its value for use as a food and in foodstuffs of the highest quality. Further objects are to provide such a treatment which will improve the soy bean oil as to its color, color stability and its resistance to the chemical decomposition which effects rancidity. Still further objects of the invention and the details of practicing the invention will be apparent from the following specification.

In general, the invention comprises the heating of the soy bean oil or partially hydrogenated soy bean oil, either before or after it is fully refined and clarified, with a small amount of finely divided zinc, magnesium or tin, out of contact with air, and for from 10 to 120 minutes, and at a temperature preferably between 240° C. and 300° C. The zinc, magnesium or tin is preferably in the form of a powder or dust, and the zinc may be what is known in commerce as zinc dust and contains, in addition to the zinc particles, some particles of zinc oxide. The metallic powder is used in small amounts, effective results having been obtained when the metallic powder was used in amounts as low as 0.01 per cent of the weight of the oil treated; that is, 0.1 gram of powder with one kilogram of oil. Generally, in practical use, the metallic powder should be in an amount from 0.05 to 0.15 per cent of that of the hydrogenated oil, by weight, or from 0.15 to 0.5 per cent of that of crude soy bean oil, by weight.

The optimum amount of metallic powder ordinarily depends upon the type and quality of the oil treated, particularly its content of free fatty acids and gums. In treating crude soy bean oils, the best practical results were obtained by using from 0.2 to 0.5 per cent of metal, by weight. Partially refined and clarified oils, such as those that have been washed with brine or dilute alkali and then treated with an adsorbent agent such as fuller's earth, react favorably to amounts from 0.08 to 0.3 per cent, by weight, while with completely refined and neutralized grades of soy bean oil good results are obtained with 0.05 to 0.15 per cent of metallic powder, by weight.

It is generally preferable to agitate the mixture during heating, either mechanically or by gas agitation. The exclusion of air during treatment may be accomplished by bubbling a stream of inert gas, such as carbon dioxide, nitrogen or hydrogen, through the mixture, or by the use of steam under a slight pressure in a similar manner. The duration of the treatment is not critical.

The agitation should be of sufficient intensity as to maintain the metallic particles suspended in the oil. The volatile impurities and reaction products formed during the treatment are allowed to escape with the exit gases, and reflux of these volatiles back into the reaction mixture is to be avoided. For instance, if the rate of flow of gas through the mixture is insufficient to prevent reflux, it is advisable to apply suction to the outlet to carry off such gases as reach the surface.

The best method, and possibly the only practical method, of evaluating and illustrating the effectiveness of the present invention, is believed to be by the application of the accelerated aging and flavor reversion tests now commonly accepted and used as standard tests in the manufacture and sale of salad oil, shortening and similar fatty foodstuffs. A preferred method of carrying out such tests is to subject the treated oil to the usual alkali refining, to bleaching and to steam-vacuum deodorization processes, and then to age 100 grams of the oil in a loosely covered beaker at 63° C., noting the time elapsed before a definite objectionable reversion odor develops in the sample. Color reversion and active oxygen values may be, and usually are, determined from the same sample.

Zinc has been used in the following specific processes of treatment, set forth by way of example:

*Example 1.*—To 1000 grams of crude, pressed soy bean oil there was added 4 grams of zinc dust, and the mixture was agitated violently in a glass vessel by a stream of carbon dioxide bubbled therethrough, at 280° C., for 30 minutes. After cooling to about 60° C., out of contact with the air, and separation from the zinc dust, the oil was refined by alkali according to the usual process, and was bleached and deodorized by the methods usually employed. An identical control sample was treated in exactly the same way except that no metallic powder was used. The treated sample had a bland and neutral flavor, and upon storing at room temperature the flavor and odor were practically unchanged after 20 days, while the untreated control sample stored under the same conditions showed a definite reversion in flavor and odor, developing a "grassy" odor within 5 days. Under storage at 63° C., a sample of the treated oil did not exhibit a reversion of flavor or odor for 8 days, while the reversion of the untreated control sample occurred in 2 days.

*Example 2.*—100 parts of crude soy bean oil was washed with 5 parts of dilute alkali solution, such amount being insufficient to entirely neutralize the fatty acids but sufficient to induce a partial break and coagulation of the non-fatty bodies, the phosphatides and the mucilaginous matter. After the resultant partially refined oil was separated from the foots, it was heated rapidly to 300° C., in a current of carbon dioxide, and 0.1 part by weight of zinc filings was added. The mixture was violently agitated at 300° C., for 40 minutes, and after separation from the zinc the oil was then cooled, refined and deodorized as in Example 1. At 63° C., flavor reversion did not occur for 7 days, as compared with 2 days for a control sample identically treated except for omission of the use of metallic particles.

*Example 3.*—A partially refined soy bean oil, prepared exactly as stated for Example 2, was hydrogenated to an iodine value of 70 with a nickel catalyst, and was then filtered from the nickel catalyst and mixed with 0.1 per cent by weight of zinc dust. The mixture was heated under agitation in a stream of nitrogen to 270° C. and held at such temperature for 90 minutes. After separation from the zinc dust and cooling, it was alkali refined, bleached with acid-treated clay, and steam deodorized under vacuum. The flavor of the oil was bland and neutral and no reversion of flavor or odor had occurred after 90 days storage at room temperature, while another sample of the same hydrogenated oil which had been treated in an identical manner, except for the omission of the zinc dust, developed a "grassy" odor upon 30 days storage at room temperature.

Magnesium used in the treatment of soy bean oil effected similar results, as shown by the following examples:

*Example 4.*—Partially refined soy bean oil was mixed with 0.2 parts by weight of magnesium metal powder, and the mixture was heated at 280° C., for 10 minutes, and under agitation, in a current of carbon dioxide. After separation from the magnesium powder the oil was cooled rapidly and refined with the usual alkali treatment and deodorized by the usual steam treatment. The product was light in color, of a bland flavor, and the characteristic soy bean reversion odor had not developed after 5 days accelerated aging test at 63° C., whereas a control sample of the same batch of partially refined oil that had been treated in an identical way, except that magnesium powder was not added, developed a strong reversion odor upon 3 days aging at 63° C.

*Example 5.*—1000 grams of soy bean oil that had been refined by the usual alkali treatment was mixed with 2 grams (0.2 per cent by weight) of magnesium powder, and the mixture was heated at 290° C., for 30 minutes, during strong agitation by bubbling a current of carbon dioxide therethrough. After separation from the metallic powder by decantation and filtration the oil was washed with dilute alkali, bleached with an activated earth and deodorized by the usual steam treatment. The product had a color of 0.5 red Lovibond, and upon storage at room temperature for 55 days flavor reversion had not developed, while a control sample of the same batch of oil treated in identically the same way except that magnesium powder was not added developed a definite reversion "grassy" flavor upon 30 days of storage at room temperature.

Tin, likewise, has been found to have a similar effect in the treatment of soy bean oil as shown by the following example:

*Example 6.*—1000 grams of refined soy bean oil was treated exactly as set forth specifically with reference to Example 5, above, except that 5 grams (0.5 per cent by weight) of finely divided tin was used in place of the magnesium powder. The product was very light in color (0.3 red Lovibond), the flavor was neutral, and upon storage at room temperature for 70 days no flavor reversion developed, whereas, as stated above, a control sample of the same oil treated in the same way except that no metallic powder was added developed a characteristic "grassy" reversion flavor upon 30 days storage at room temperature.

In any case, after heat treatment of the soy bean oil with the metallic particles of zinc, magnesium or tin, the optimum strength of the alkali used to carry out the alkali refining step must be determined for any particular oil by trial and error, because some of the mucilaginous non-fats, which are present in variable quantities in various oils, are destroyed and a small amount of the metallic powder is combined or is colloidally suspended in the oil. As a general rule, however, less alkali will be required when the flavor-stabilizing treatment with metallic powder as described herein has been carried out than would be needed to refine the same oil which has not been subjected to such flavor-stabilizing treatment. Moreover, soy bean oil that has been extracted by an expeller differs somewhat in character from that extracted by solvent action or that extracted by pressure under heat, and each type responds differently to the flavor-stabilizing treatment herein described, so that the process can not be set forth as to exact details of proportion of metallic powder, or temperature and duration of the treatment, but a slight experience will enable one skilled in the art to practice the invention to great advantage, regardless of the character of the oil treated.

It is appreciated, of course, that the treatment of soy bean oil for short periods with steam or inert gas at high temperatures has been well known and practiced for many years, and the present invention comprises not merely the carrying out of such a treatment but to the carrying out of such a treatment in the presence of finely divided particles of zinc, magnesium or tin. While I do not limit the invention to any particular theory, it is my belief that the finely divided particles of zinc, magnesium or tin react, at the high temperatures stated, with some of the non-fatty odorous constituents of the soy bean oil, rendering them less obnoxious, and that it is also possible that the finely divided metallic particles may have a catalytic action in effecting a rearrangement of the several saturated and unsaturated fatty acid components in the soy bean molecule, stabilizing the unsaturated fractions against organoleptic changes under ordinary storage conditions.

What I claim is:

1. The method of stabilizing soy bean oil against flavor reversion, which comprises the step of heating the oil at a temperature between 240° C. and 300° C., out of contact with the air and in the presence of finely divided particles of metal selected from the group consisting of zinc, magnesium and tin for a period of between 10 and 120 minutes.

2. The method of stabilizing soy bean oil against flavor reversion, which comprises the step of mixing with the oil finely divided particles of metal selected from the group consisting of zinc, magnesium and tin, and maintaining said mixture at a temperature between 240° C. and 300° C. during agitation out of contact with the air, for a period of between 10 and 90 minutes.

3. The method of stabilizing soy bean oil against flavor reversion, which comprises the step of mixing with the oil finely divided particles of metal selected from the group consisting of zinc, magnesium and tin, the proportion of said particles to the oil being from 0.01 per cent to 0.5 per cent by weight, and heating the mixture during agitation out of contact with the air to a temperature between 240° C. and 300° C. for a period of at least 10 minutes and not exceeding 45 minutes.

4. The method of stabilizing soy bean oil against flavor reversion, which comprises the step of mixing with the oil finely divided particles of metal selected from the group consisting of zinc, magnesium and tin, the proportion of said particles to the oil being from 0.01 per cent to 0.5 per cent by weight, and heating said mixture during agitation out of contact with the air to a temperature between 270° C. and 300° C. for a period of between 10 to 120 minutes.

5. The method of stabilizing soy bean oil against flavor reversion, which comprises the step of heating the oil at a temperature between 270° C. and 300° C. out of contact with the air for a period of between 10 to 45 minutes and while agitating it in the presence of finely divided particles of metal selected from the group consisting of zinc, magnesium and tin.

HARVEY D. ROYCE.